(12) United States Patent
Kurobe et al.

(10) Patent No.: US 6,799,891 B2
(45) Date of Patent: Oct. 5, 2004

(54) MOTOR DEVICE

(75) Inventors: Kisaburo Kurobe, Osaka (JP); Masashi Omura, Kobe (JP); Eisaku Sakoda, Amagasaki (JP)

(73) Assignee: Matsushita Electric Industrial Co., Ltd. (JP)

( * ) Notice: Subject to any disclaimer, the term of this patent is extended or adjusted under 35 U.S.C. 154(b) by 89 days.

(21) Appl. No.: 10/369,734

(22) Filed: Feb. 21, 2003

(65) Prior Publication Data

US 2003/0161559 A1 Aug. 28, 2003

(30) Foreign Application Priority Data

Feb. 22, 2002 (JP) ........................................ 2002-045650

(51) Int. Cl.$^7$ ............................................. F16C 17/10
(52) U.S. Cl. ......................... 384/107; 384/420; 384/121
(58) Field of Search ................................ 384/107, 121, 384/123, 124, 112

(56) References Cited

U.S. PATENT DOCUMENTS 5,112,141 A * 5/1992 Asada et al. ................. 384/100
5,806,987 A * 9/1998 Nose et al. .................. 384/100

\* cited by examiner

Primary Examiner—Lenard A. Footland
(74) Attorney, Agent, or Firm—Parkhurst & Wendel, L.L.P.

(57) ABSTRACT

According to the present invention, a cylindrical side wall is provided in a housing so as to surround an outer periphery of a stopper member. Further, an end surface of the side wall is higher than a top surface of outermost periphery of the stopper member. Oil otherwise scattered is received by the side wall for collection. Oil is thus prevented from scattering even if during manufacturing, the amount of oil dripped between the shaft and the oil-impregnated bearing is not strictly controlled, so that a slightly excessive amount of oil is dripped. Therefore, the present motor device enables manufacturing operations to be favorably performed, and is reliable having a long lifetime.

7 Claims, 13 Drawing Sheets

MOTOR DEVICE

FIELD OF THE INVENTION

The present invention relates to a motor device with an oil-impregnated bearing which can be used for a magnetic recording and reproducing apparatus and the like.

BACKGROUND OF THE INVENTION

A motor device with an oil-impregnated bearing has been used for a capstan motor of a video tape recorder and the like (see Japanese Unexamined Patent Application Laid-Open No. 8-163806).

Figure 9:
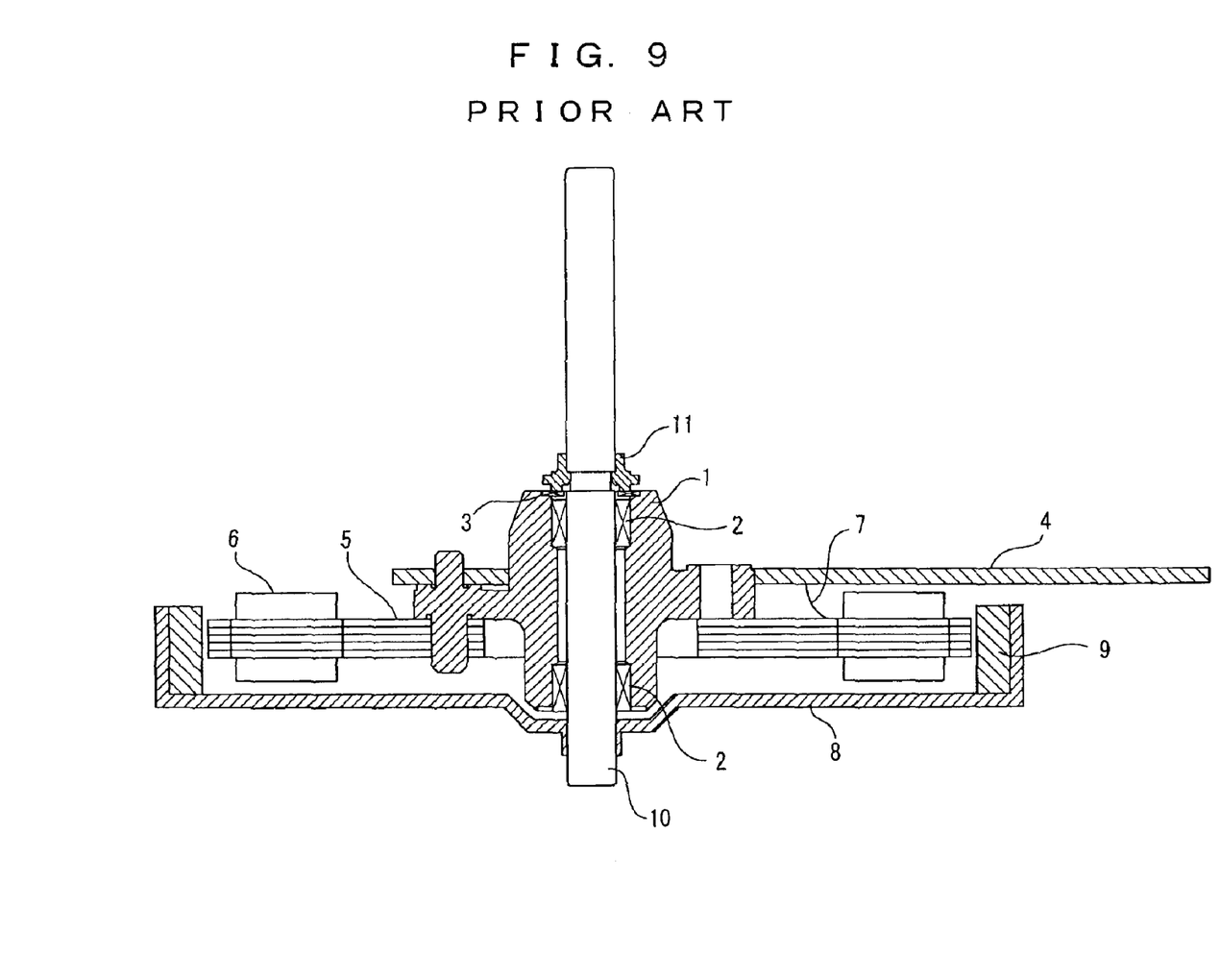
FIG. 9 is a sectional view of a conventional motor device.

FIG. 9 shows a conventional motor device.

Reference numeral 1 denotes a housing that holds an oil-impregnated bearing 2 and a thrust bearing plate 3. Reference numeral 4 denotes a stator printed circuit board mounted to the housing 1, to which an end 7 of a wire of a coil 6 wound around a stator core 5 is connected. Reference numeral 8 denotes a rotor plate that holds a main magnet 9 and that has a shaft 10 attached to its center, the shaft being inserted into and supported by the oil-impregnated bearing 2. Reference numeral 11 denotes a stopper member pressed into the shaft 10 so as to prevent the shaft 10 from slipping out of the oil-impregnated bearing 2. The stopper member 11 slides on the thrust bearing plate 3.

Figure 10:
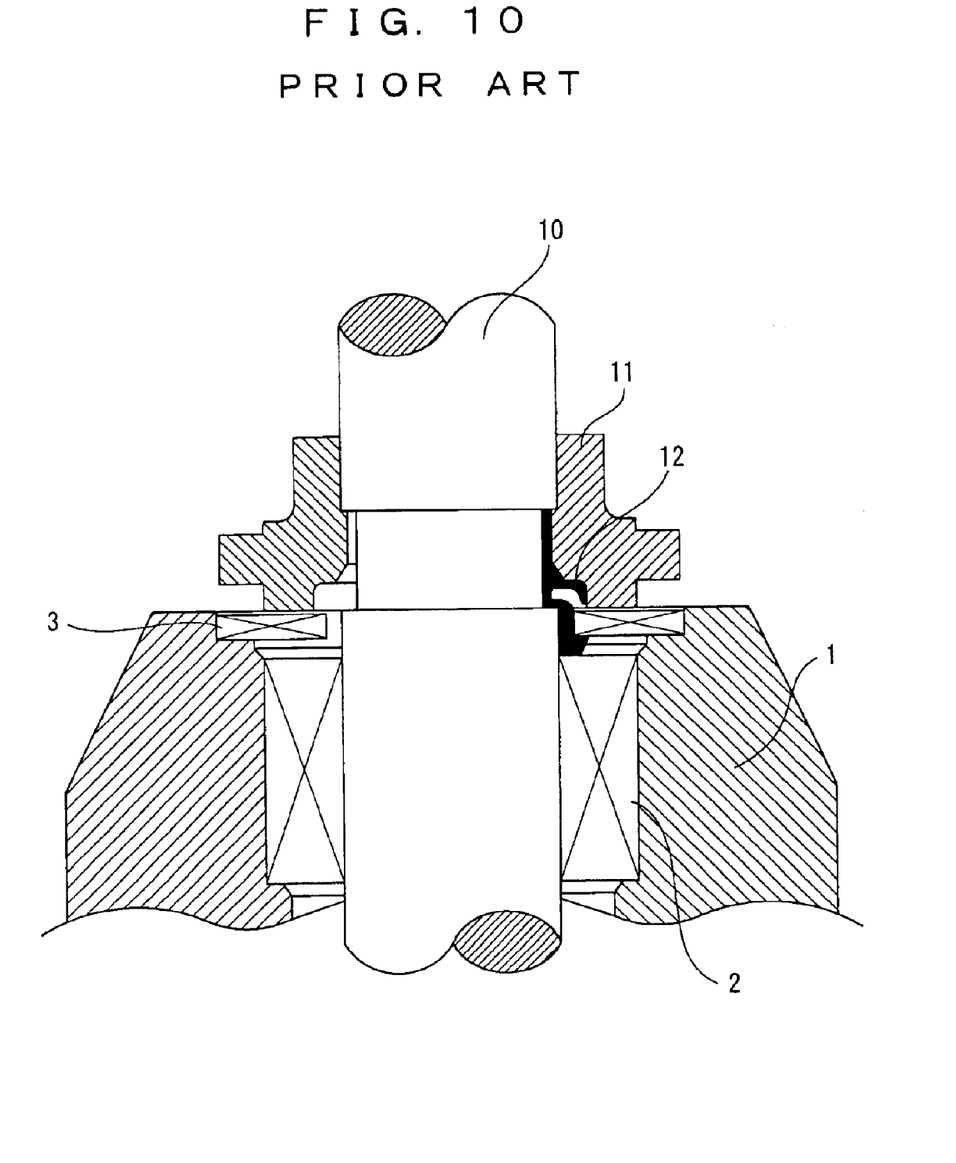
FIG. 10 is an enlarged sectional view of essential parts; of FIG. 9.

The rotor plate 8, including the stopper member 11, is rotated to smoothly slide the shaft 10 and the oil-impregnated bearing 2. At this time, as shown in FIG. 10, because of oil dripped between the shaft 10 and the oil-impregnated bearing 2 and a pumping phenomenon caused by the sliding of the oil-impregnated bearing 2 and the shaft 10, oil 12 oozes out from the oil-impregnated bearing 2 to lubricate between the shaft 10 and the oil-impregnated bearing 2. This allows the bearing to function favorably while being lubricated.

Figure 11:
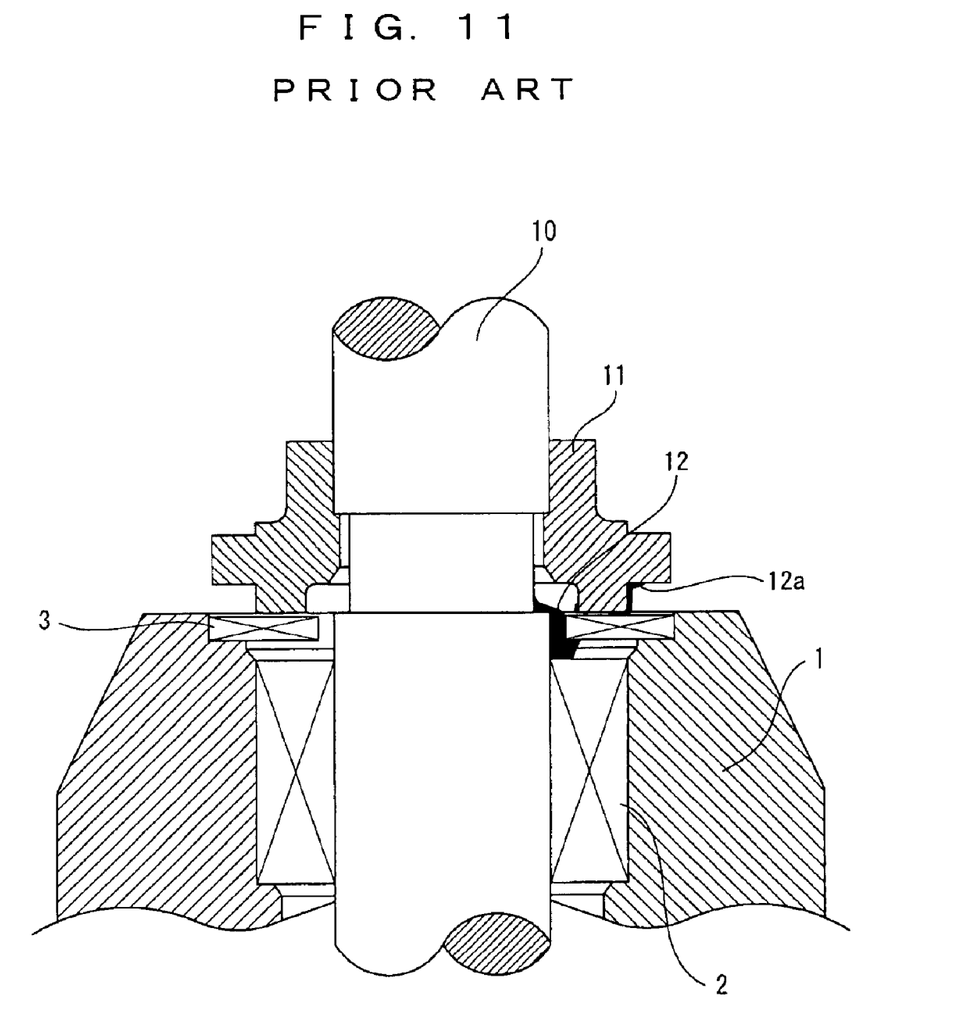
FIG. 11 is a view illustrating a process in which oil flows out.
Figure 12:
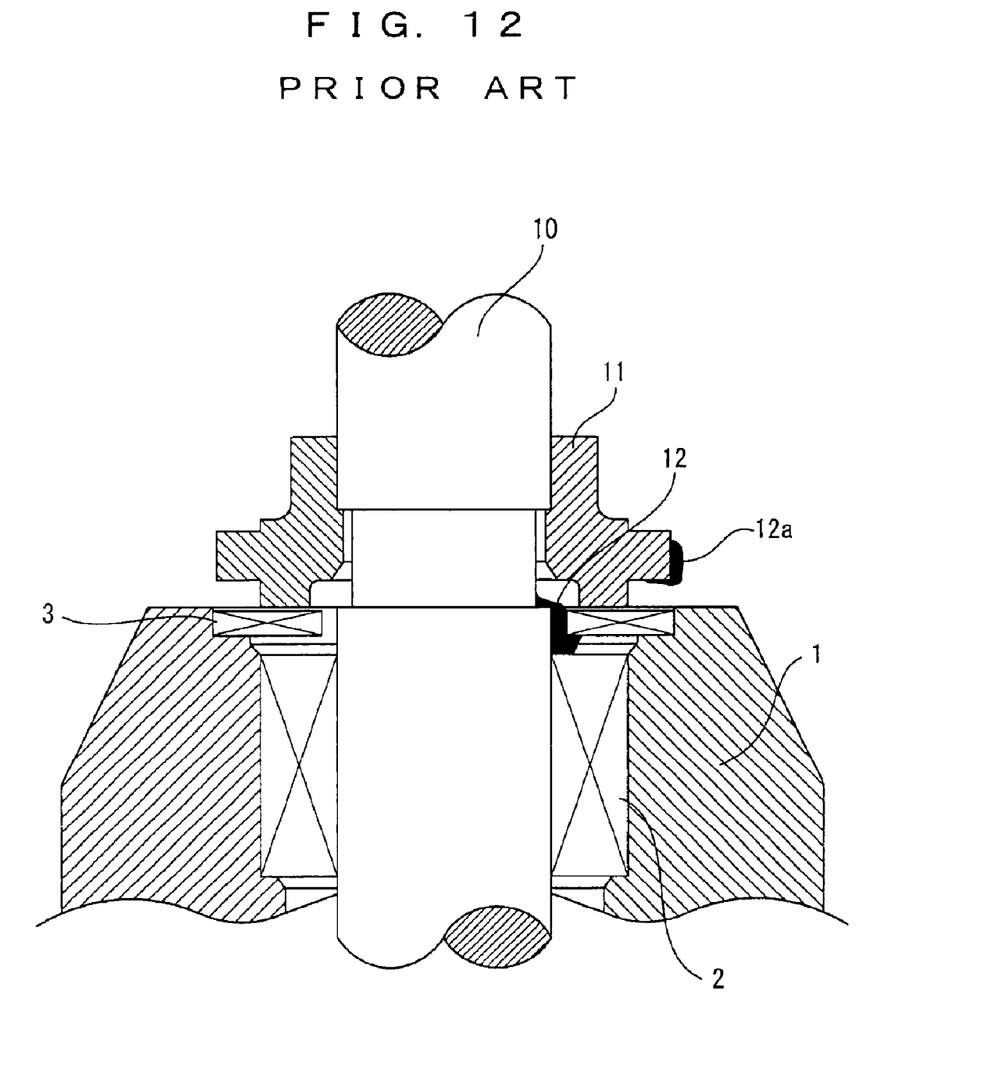
FIG. 12 is a view illustrating the process in which oil flows out.
Figure 13:
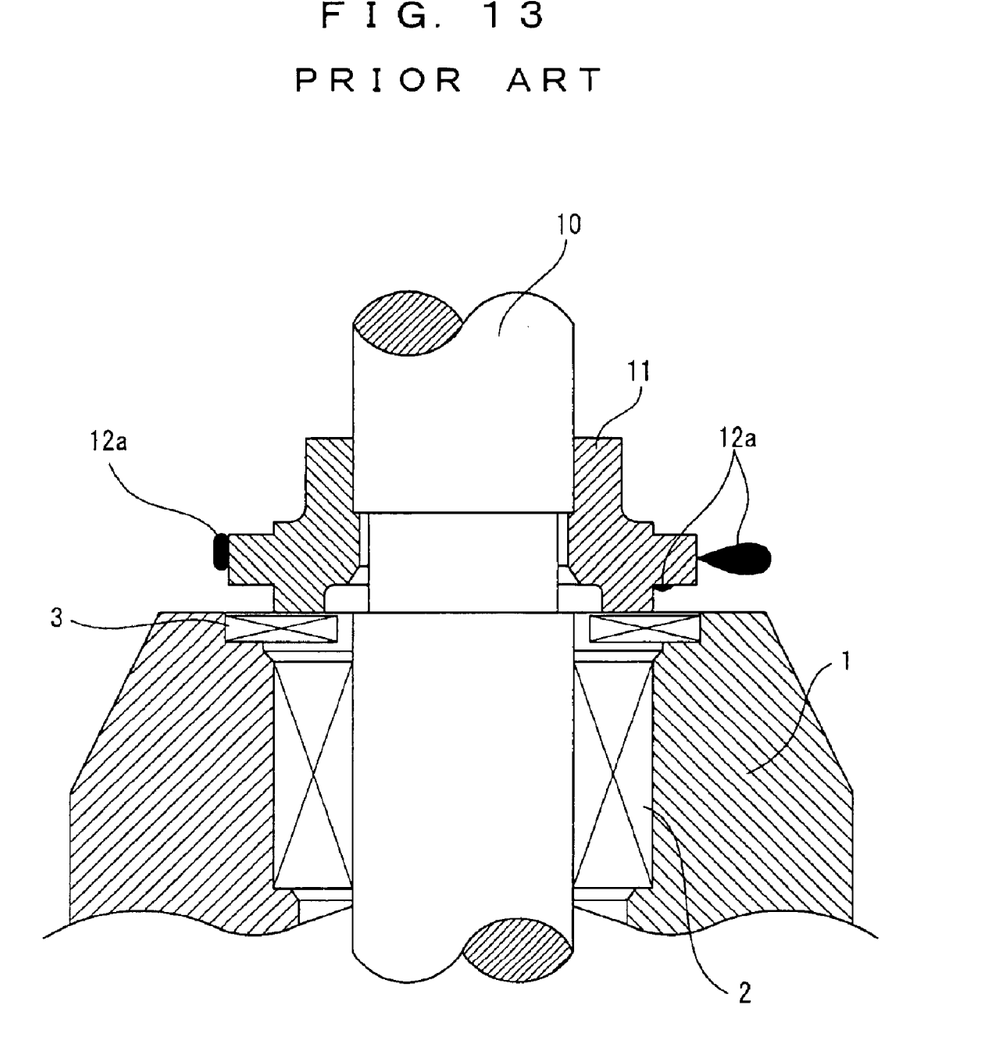
FIG. 13 is a view illustrating how the flowed-out oil scatters.

However, with the above conventional configuration, while the shaft 10 and the oil-impregnated bearing 2 are sliding smoothly, the oil 12 oozes out through the stopper member 11 as shown in FIG. 11. As the stopper member 11 rotates at high speed as shown in FIG. 12, leaking oil 12a is scattered toward the surroundings owing to centrifugal force as showing FIG. 13. The scattered oil 12a sticks to a magnetic recording tape (not shown) in a magnetic recording and reproducing apparatus. This hinders the tape from running stably.

Further, if a large amount of oil is dripped between the shaft 10 and the oil-impregnated bearing 2, it may be scattered. On the other hand, the amount of oil is insufficient, the lifetime of the bearing is shortened. Accordingly, the amount of oil must be controlled. This currently affects operability during manufacturing.

Furthermore, when the oil 12a is scattered, the amount of oil 12 otherwise contained in the oil-impregnated bearing 2 decreases. This significantly shortens the lifetime of the bearing.

DISCLOSURE OF THE INVENTION

The present invention solves these conventional problems. It is an object of the present invention to provide a motor device that allows manufacturing operations to be favorably performed, that is reliable and has a long lifetime, and that has a bearing enabling a tape to run stably over a long time if a magnetic recording and reproducing apparatus employs this motor device.

To accomplish this object, a motor device according to the present invention comprises a housing that holds a bearing, a shaft inserted into and supported by the bearing, oil that lubricates between the shaft and the bearing, a thrust bearing plate pressed into and fixed to the housing, and a stopper member pressed into the shaft so as to prevent the shaft from slipping out of the bearing, the stopper member sliding on the thrust bearing plate. The motor device characterizes at least any one of the following points.

(1) A cylindrical side wall integrated with the housing is located at an end side of the housing that is closer to the thrust bearing plate so as to surround an outer periphery of the stopper member, and an end surface of the side wall is higher than a top surface of the outermost periphery of the stopper member.

(2) A groove is formed around the shaft in a surface of the stopper member which is opposite the thrust bearing plate.

With this configuration, while the shaft and the oil-impregnated bearing are sliding smoothly, oil is prevented from oozing out through the stopper member and then scattering. In other words, oil can be prevented from scattering, even if the amount of oil dripped between the shaft and the oil-impregnated bearing during manufacturing is not strictly controlled so that a slightly excessive amount of oil is dripped. Consequently, such a motor device can be realized that allows manufacturing operations to be favorably performed, that is reliable and has a long lifetime, and that has a bearing enabling a tape to run stably over a long time if a magnetic recording and reproducing apparatus employs this motor device.

A motor device according to the present invention comprises a housing that holds a bearing, a shaft inserted into and supported by the bearing, oil that lubricates between the shaft and the bearing, a thrust bearing plate pressed into and fixed to the housing, and a stopper member pressed into the shaft so as to prevent the shaft from slipping out of the bearing, the stopper member sliding on the thrust bearing plate. The motor device is characterized in that a cylindrical side wall integrated with the housing is located on an end side of the housing that is closer to the thrust bearing plate, so as to surround an outer periphery of the stopper member, and an end surface of the side wall is set to be higher than a top surface of the outermost periphery of the stopper member.

Further, a motor device according to the present invention comprises a housing that holds a bearing, a shaft inserted into and supported by the bearing, oil that lubricates between the shaft and the bearing, a thrust bearing plate pressed into and fixed to the housing, and a stopper member pressed into the shaft, the stopper member sliding on the thrust bearing plate. The motor device is characterized in that a groove is formed around the shaft in a surface of the stopper member opposite the thrust bearing plate.

Furthermore, the motor device according to the present invention is characterized in that a cylindrical side wall integrated with the housing is located on an end side of the housing that is closer to the thrust bearing plate, so as to surround an outer periphery of the stopper member, and an end surface of the side wall is set to be higher than a top surface of the outermost periphery of the stopper member, and in that a groove is formed around the shaft in a surface of the stopper member that is opposite the thrust bearing plate.

Moreover, the motor device according to the present invention is characterized in that a cylindrical side wall is provided on an end side of the housing that is closer to the thrust bearing plate, so as to surround an outer periphery of the stopper member, and an end surface of the side wall is set to be higher than a top surface of the outermost periphery of the stopper member.

Further, the motor device according to the present invention is characterized in that a cylindrical side wall is located on an end side of the housing that is closer to the thrust bearing plate, so as to surround an outer periphery of the stopper member, and an end surface of the side wall is set to be higher than a top surface of the outermost periphery of the stopper member, and in that a groove is formed around the shaft in a surface of the stopper member that is opposite the thrust bearing plate.

Furthermore, the motor device according to the present invention is characterized in that an oil repellent film is formed on the end surface of the side wall. Moreover, the motor device according to the present invention is characterized in that an oil repellent film is formed on the surface of the stopper member that is opposite the thrust bearing plate, at a position peripherally outward of the groove.

DESCRIPTION OF THE EMBODIMENTS

Embodiments of the present invention will be described below with reference to FIGS. 1 to 8.

Components that are similar to those in FIGS. 9 and 10, showing a conventional example, are denoted by the same reference numerals.

(Embodiment 1)

FIGS. 1 to 6 show Embodiment 1 of the present invention.

Figure 1:
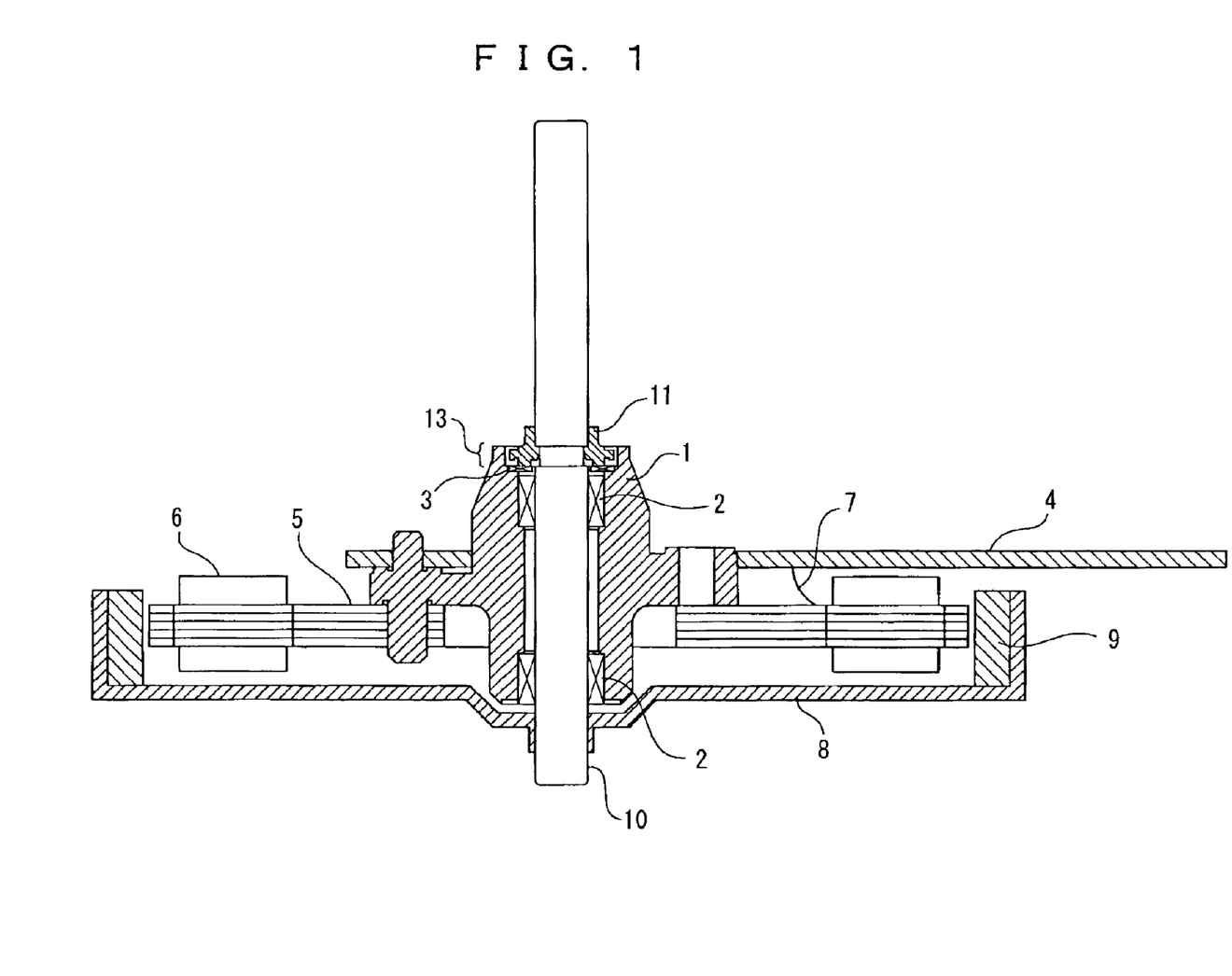
FIG. 1 is a sectional view of a motor device according to Embodiment 1 of the present invention.
Figure 2:
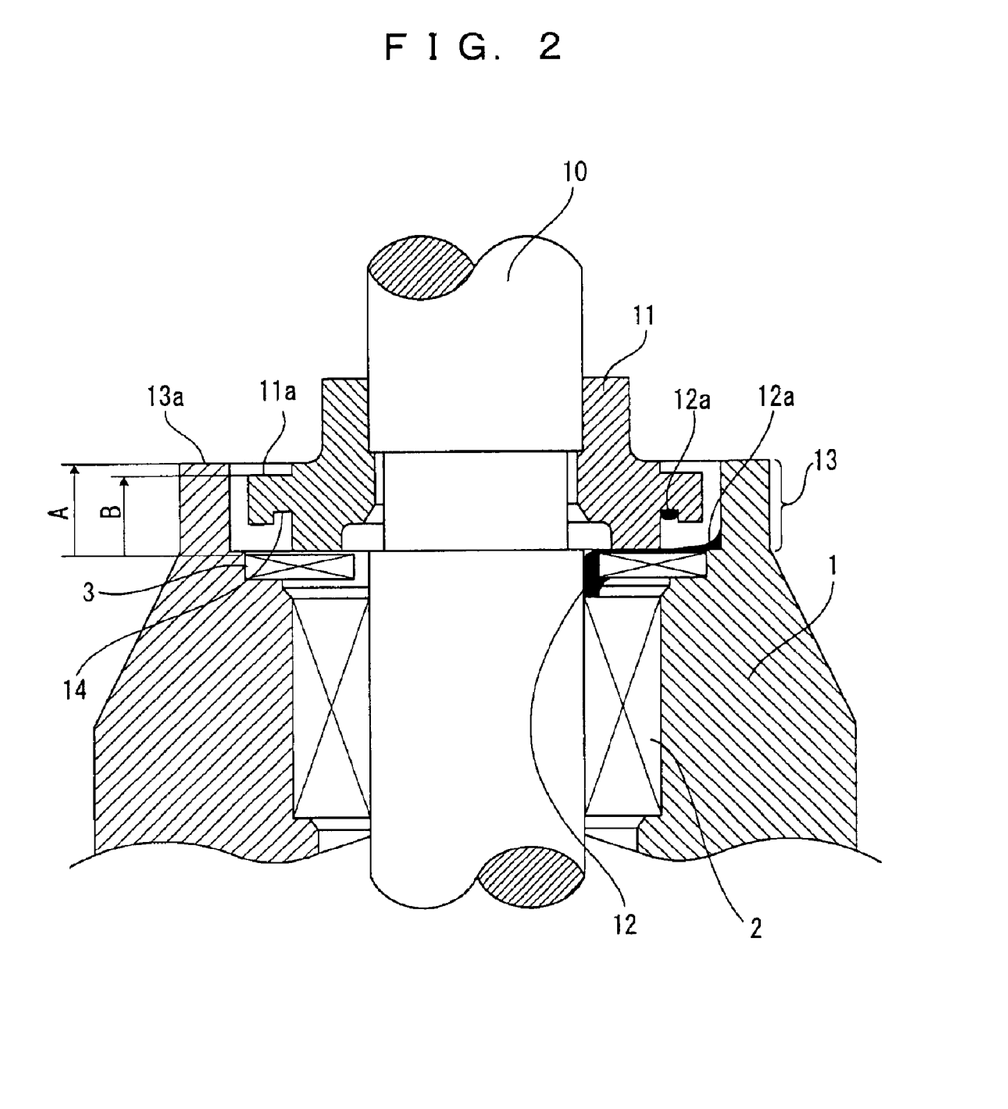
FIG. 2 is an enlarged sectional view of essential parts of Embodiment 1.

FIG. 1 shows a motor device of the present invention which can be used for a capstan motor for a video tape recorder. FIG. 2 shows essential parts of the motor device.

The shapes of the housing 1 and the stopper 11 differ from those in the conventional example in the points described below. The other points are the same as those in the conventional example.

In the housing 1 shown in FIGS. 1 and 2, a side wall 13 is formed integrally with the housing 1 and on a side of the housing that is closer to the thrust bearing plate 3, so as to surround the outer periphery of the stopper member 11.

This embodiment is also different from the conventional example in that the height A from the thrust bearing plate 3 to an end surface 13a of the side wall 13 is larger than the height B from the thrust bearing plate 3 to a top surface 11a of outermost periphery of the stopper member 11.

This embodiment is also different from the conventional example in that the stopper member 11 shown in FIGS. 1 and 2 has an annular groove 14 formed around the shaft 10 in its surface opposite to the thrust bearing plate 3.

Figure 3:
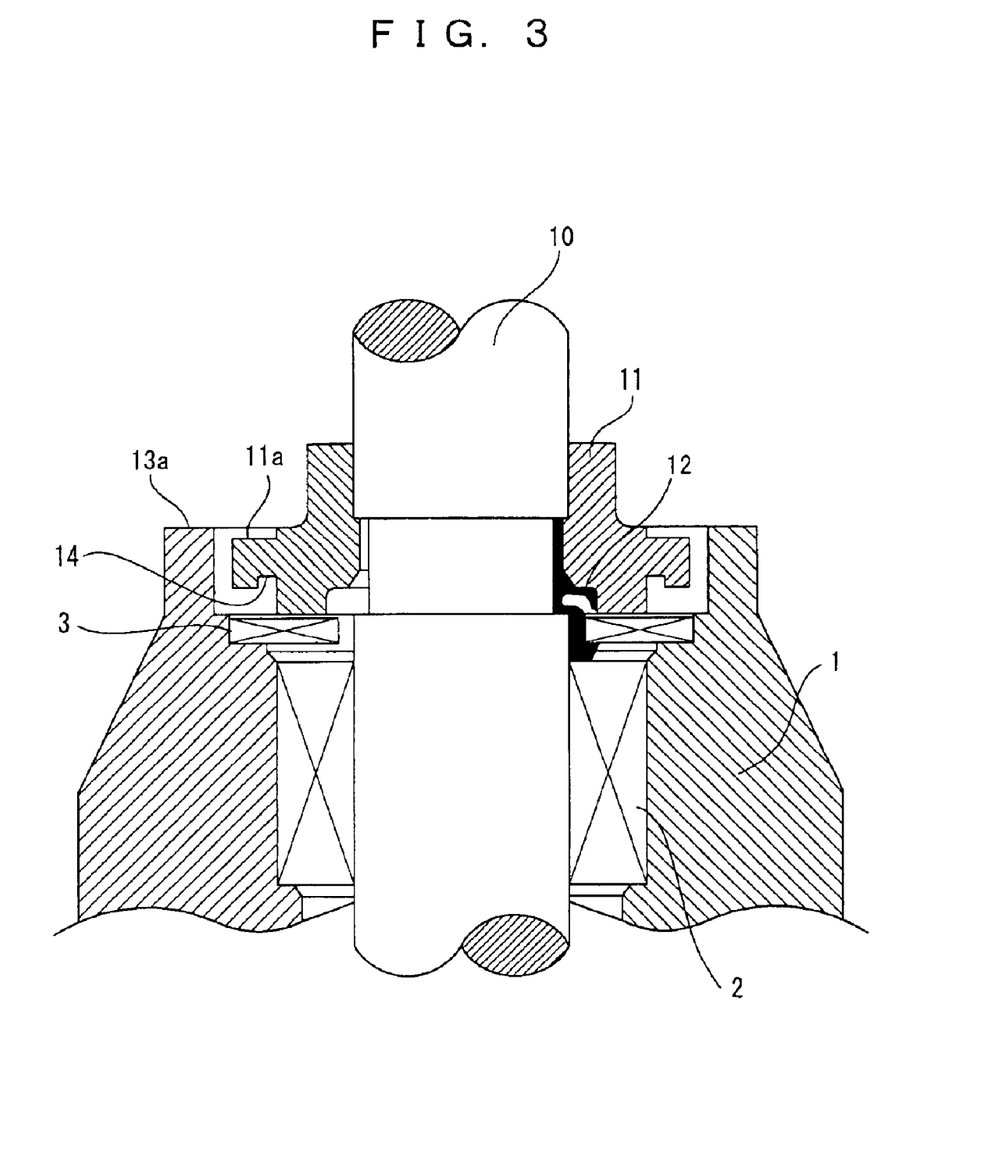
FIG. 3 is a view illustrating a process in which oil flows out according to Embodiment 1.

With this configuration, the rotor plate 8, including the stopper member 11, is rotated to smoothly slide the shaft 10 and the oil-impregnated bearing 2. At this time, as shown in FIG. 3, because of oil dripped between the shaft 10 and the oil-impregnated bearing 2 and a pumping phenomenon caused by the sliding of the oil-impregnated bearing 2 and the shaft 10, the oil 12 oozes out from the oil-impregnated bearing 2 to lubricate between the shaft 10 and the oil-impregnated bearing 2. This allows the bearing to function favorably while being lubricated.

Figure 4:
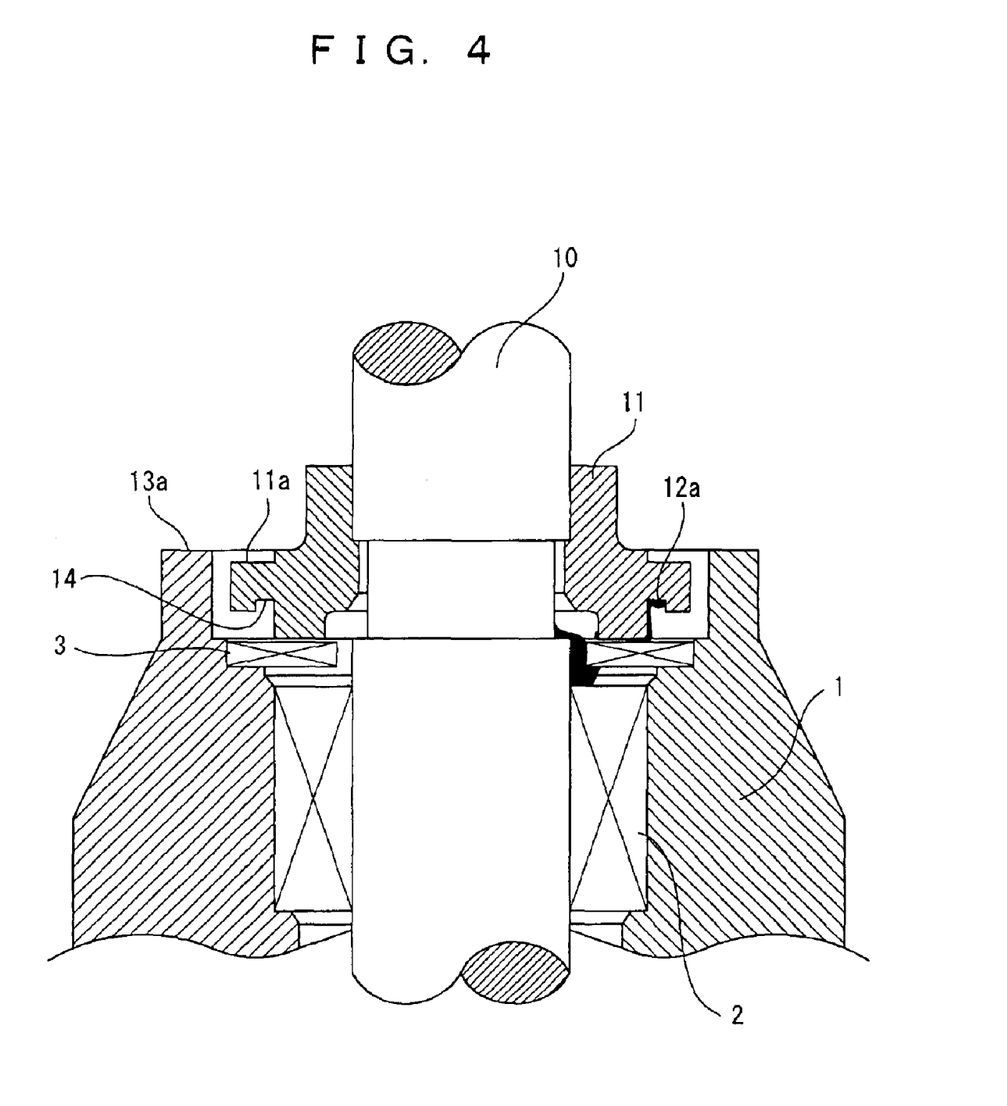
FIG. 4 is a view illustrating the process in which oil flows out according to Embodiment 1.

If during manufacturing, the amount of oil dripped between the shaft and the oil-impregnated bearing is not strictly controlled, so that a slightly excessive amount of oil is dripped, then the oil 12a oozing out as shown in FIG. 4 as the stopper member 11 rotates at high speed is collected in the groove 14. The oil 12a is thus prevented from flowing out toward the outer periphery of the stopper member 11.

Figure 5:
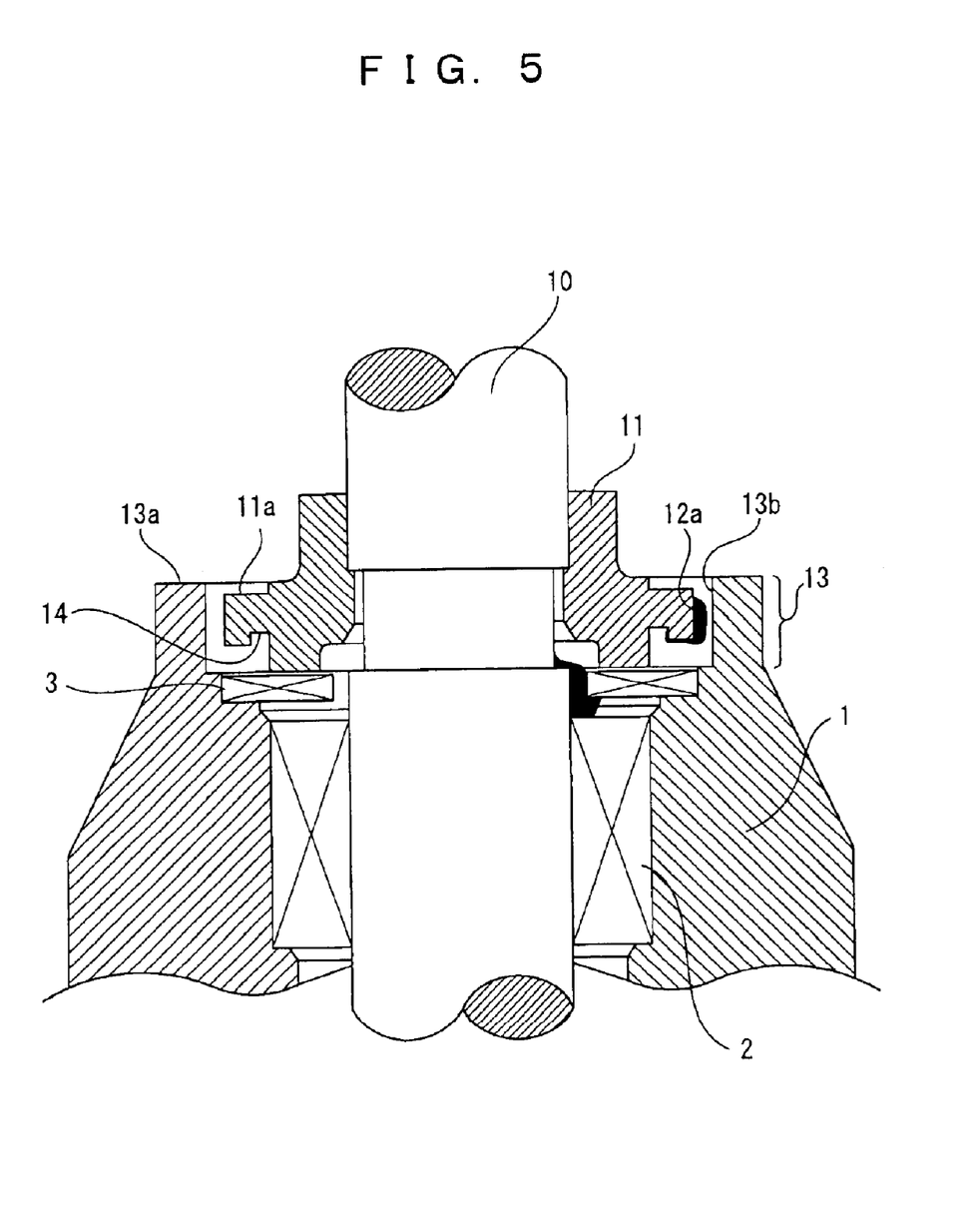
FIG. 5 is a view illustrating the process in which oil flows out according to Embodiment 1.
Figure 6:
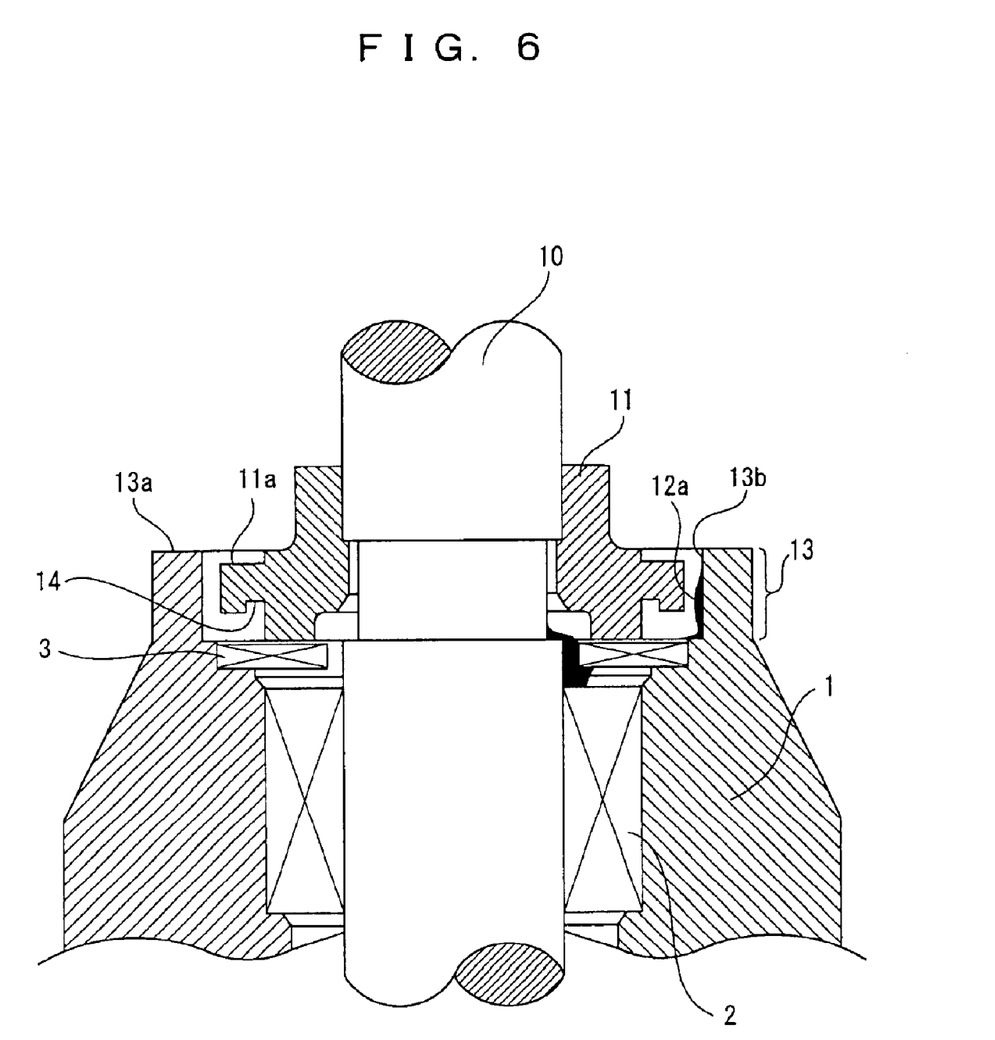
FIG. 6 is a view illustrating a process of collecting the flowed-out oil according to Embodiment 1.

Furthermore, it is assumed that centrifugal force causes the oil 12a to flow out from the groove 14 in the stopper member 11 to the outer periphery of the stopper member 11 as shown in FIG. 5. Then, since the end surface 13a of the side wall 13, integrated with the housing 1 as described above, is higher than the top surface 11a of outermost periphery of the stopper member 19, the oil 12a, otherwise scattered from the outer periphery of the stopper member 11 owing to the centrifugal force, is received by an inner peripheral portion 13b of the side wall 13, which is higher than the top surface 11a of outermost periphery of the stopper member 19. The oil 12a received in the inner peripheral portion 13b of the housing 1 as shown in FIG. 6 returns to the oil-impregnated bearing 2 owing to gravity. A decrease in the amount of oil 12 is thus prevented, thus enabling a long-lived bearing to be realized.

Consequently, this motor device allows manufacturing operations to be favorably performed, is reliable, and has a long lifetime. It also enables a tape to run stably over a long time when used for a capstan motor for video recorder.

In Embodiment 1, the end surface 13a of side wall 13 of the stopper member 11 is formed to be higher than the top surface 11a of outermost periphery of the stopper member 11. Further, the grove 14 is formed in the surface of the stopper member 11 which is opposite the thrust bearing plate 3. However, in a variation of this embodiment, although the end surface 13a of side wall 13 of the stopper member 11 is formed to be higher than the top surface 11a of outermost periphery of the stopper member 11, the groove 14 may not be formed in the stopper member 11. In another variation of this embodiment, the end surface 13a of side wall 13 of the stopper member 11 may not be formed to be higher than the top surface 11a of outermost periphery of the stopper member 11, but the groove 14 is formed in the stopper member 11. Even in these variations, this motor device allows manufacturing operations to be favorably performed, is reliable, and has a long lifetime. It also enables a tape to run stably over a long time when used for a capstan motor for video recorder.

(Embodiment 2)

Figure 7:
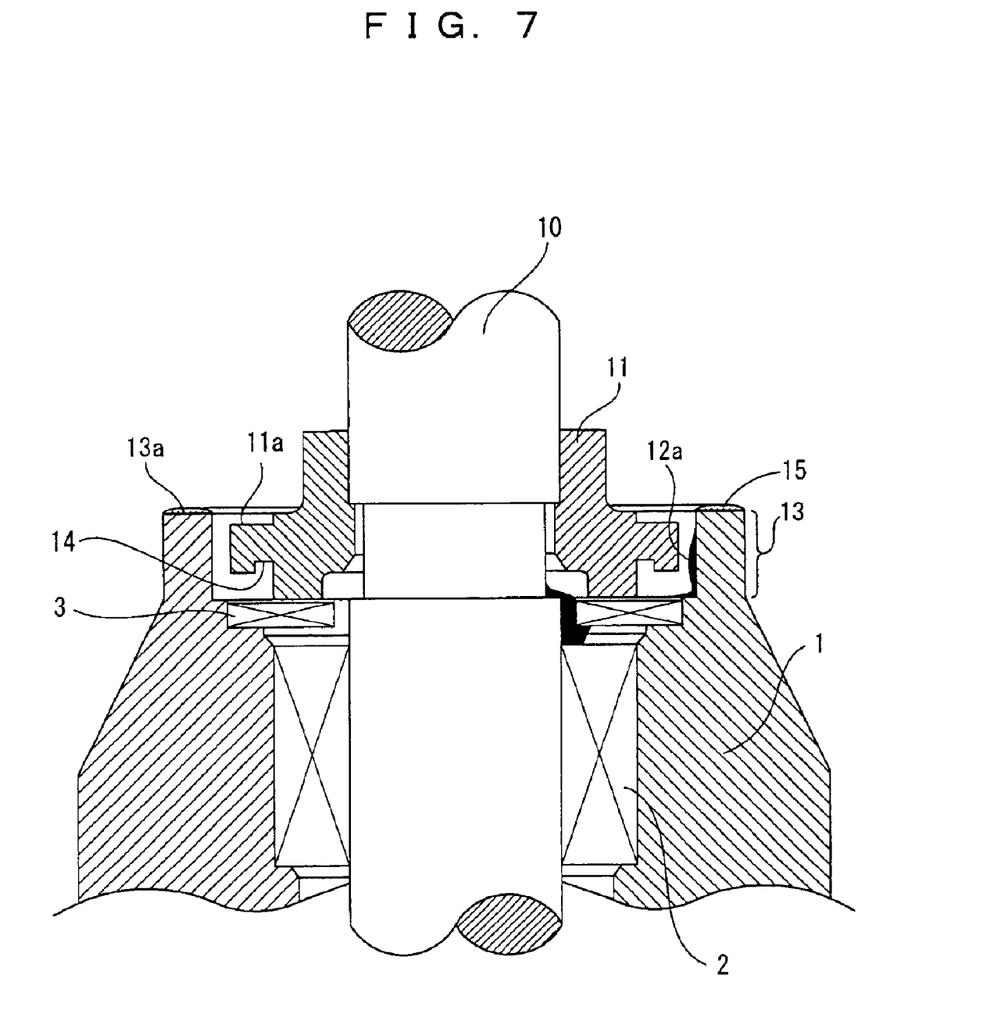
FIG. 7 is an enlarged sectional view of essential parts of a motor device according to Embodiment 2 of the present invention.

FIG. 7 shows Embodiment 2 of the present invention.

In Embodiment 2, an oil repellent film 15 is formed on the end surface 13a of the side wall 13 in Embodiment 1 by applying an oil repellant to this surface.

Thus forming the oil repellent film 15 hinders the oil 12a from flowing from the inner peripheral portion 13b of the side wall 13 toward the end surface 13a. It is expectable to improve the effect of prevention of scattering.

(Embodiment 3)

Figure 8:
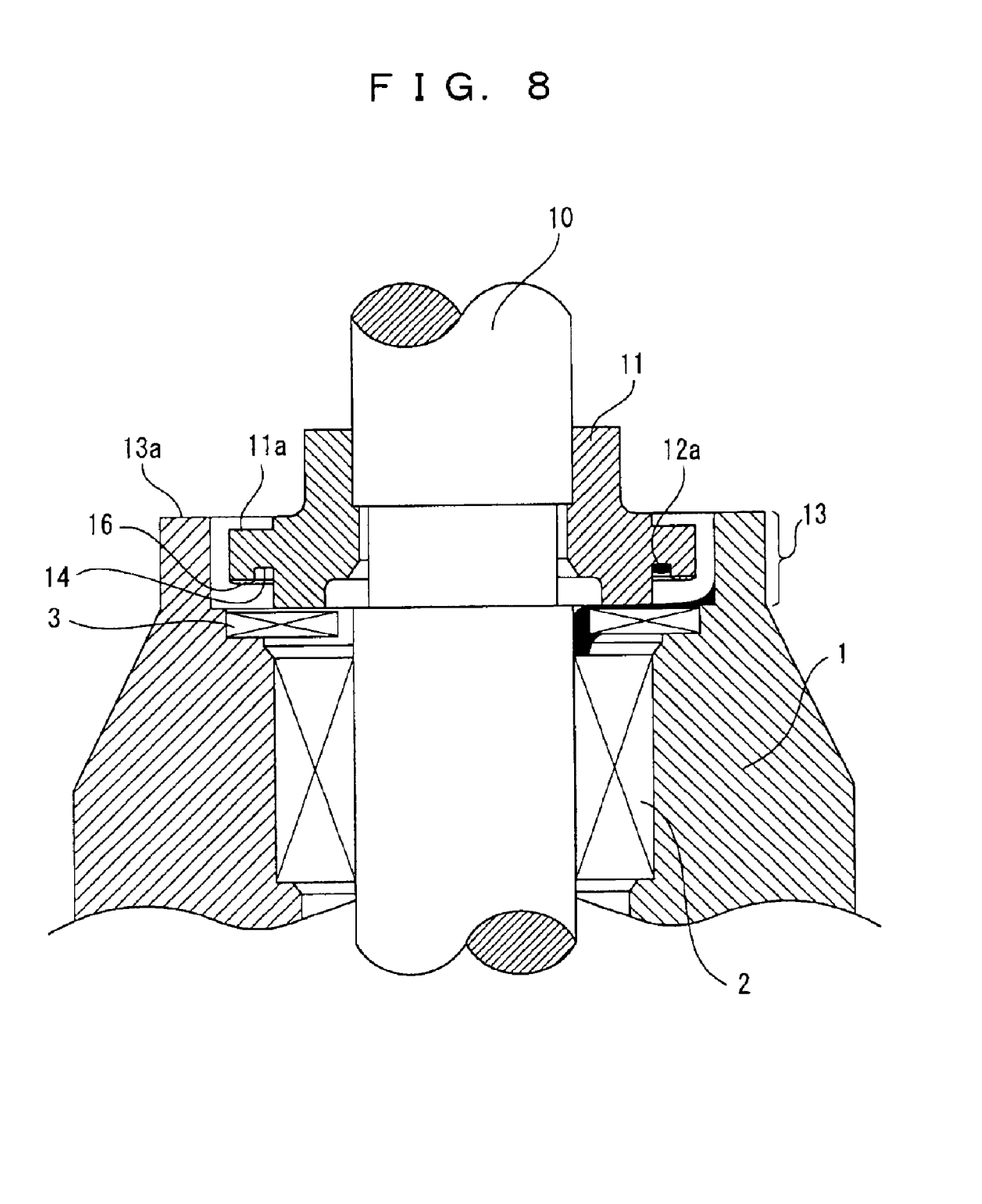
FIG. 8 is an enlarged sectional view of essential parts of a motor device according to Embodiment 3 of the present invention.

FIG. 8 shows Embodiment 3.

In Embodiment 3, an oil repellent film 16 is formed on the stopper member 11 according to Embodiment 1 by applying an oil repellant to this member at a position peripherally outward of the groove 14.

Thus forming the oil repellent film 16 hinders the oil 12a from flowing from the groove 14 toward the outer periphery of the stopper member 11. It is expectable to improve the effect of prevention of scattering.

In the above description, Embodiments 2 and 3 are each combined with the basic configuration of Embodiment 1. However, a combination of Embodiment 1 with the configuration described in Embodiment 1 as a variation is also more effective than the conventional example.

Furthermore, more favorable effects are obtained by providing, in the basic configuration or variation of Embodiment 1, the oil repellent film 15 formed on the end surface 13a of the side wall 13 and the oil repellent film 16 formed on the stopper member 11 at the position more peripherally outward of the groove 14 in the stopper member 11, and further implementing Embodiments 2 and 3.

In the above embodiments, the side wall 13 is integrated with the housing 1. However, similar effects are expected even if a separate member is attached to the housing 1 to form the cylindrical side wall 13 surrounding the outer periphery of the stopper member 11.

As described above, the motor device according to the present invention comprises the housing that holds the bearing, the shaft inserted into and supported by the bearing, the oil that lubricates between the shaft and the bearing, the thrust bearing plate pressed into and fixed to the housing, and a stopper member pressed into the shaft so as to prevent the shaft from slipping out of the bearing, the stopper member sliding on the thrust bearing plate. The motor device is characterized in that the cylindrical side wall is provided on the side of the housing that is closer to the thrust bearing plate, so as to surround an outer periphery of the stopper member, and the end surface of the side wall is higher than the top surface of outermost periphery of the stopper member or the groove around the shaft is formed in the surface of the stopper member which is opposite the thrust bearing plate. Consequently, the oil otherwise scattered from the outer periphery of the stopper member is received by the side wall for collection. Further, the groove prevents the oil from moving toward the outer periphery of the stopper member, the oil otherwise moving toward the outer periphery along the surface of the stopper member which is opposite the thrust bearing plate. The oil is thus prevented from scattering even if during manufacturing, the amount of oil dripped between the shaft and the oil-impregnated bearing is not strictly controlled, so that a slightly excessive amount of oil is dripped. Therefore, the present motor device enables manufacturing operations to be favorably performed, is reliable, and has a long lifetime.

What is claimed is:

1. A motor device comprising:

a housing for holding a bearing;

a shaft inserted into and supported by the bearing;

oil lubricating between the shaft and the bearing;

a thrust bearing plate pressed into and fixed to the housing; and a stopper pressed into the shaft to prevent the shaft from slipping out of the bearing, the stopper sliding on the thrust bearing plate, wherein a cylindrical side wall integrated with the housing is located at an end side of the housing that is closer to the thrust bearing plate thereby to surround an outer periphery of the stopper, said side wall having an end surface set to be higher than a top surface of an outermost periphery of the stopper.

2. A motor device comprising:

a housing for holdings a bearing;

a shaft inserted into and supported by the bearing;

oil lubricating between the shaft and the bearing;

a thrust bearing plate pressed into and fixed to the housing; and a stopper pressed into the shaft, the stopper sliding on the thrust bearing plate, wherein a groove is formed around the shaft in a surface of the stopper opposite the thrust bearing plate.

3. The moter device according to claim 2, wherein an oil repellent film is formed on the stopper on the surface of the stopper that is opposite the thrust bearing plate, at a position peripherally outward of the groove.

4. The motor device according to claim 1, wherein an oil repellent film is formed on the end surface of the side wall.

5. A motor device comprising:

a housing for holdings a bearing;

a shaft inserted into and supported by the bearing;

oil lubricating between the shaft and the bearing;

a thrust bearing plate pressed into and fixed to the housing; and a stopper pressed into the shaft to prevent the shaft from slipping out of the bearing, the stopper sliding on the thrust bearing plate, wherein a cylindrical side wall is located at an end side of the housing that is closer to the thrust bearing plate thereby to surround an outer periphery of the stopper, said side wall having an end surface set to be higher than a top surface of an outermost periphery of the stopper, and a groove is formed around the shaft in a surface of the stopper opposite the thrust bearing plate.

6. A motor device comprising:

a housing for holdings a bearing;

a shaft inserted into and supported by the bearing;

oil lubricating between the shaft and the bearing;

a thrust bearing plate pressed into and fixed to the housing; and a stopper pressed into the shaft to prevent the shaft from slipping out of the bearing, the stopper sliding on the thrust bearing plate, wherein a cylindrical side wall integrated with the housing is located at an end side of the housing that is closer to the thrust bearing plate thereby to surround an outer periphery of the stopper, said side wall having an end surface set to be higher than a top surface of an outermost periphery of the stopper, and a groove is formed around the shaft in a surface of the stopper opposite the thrust bearing plate.

7. A motor device comprising:

a housing for holdings a bearing;

a shaft inserted into and supported by the bearing;

oil lubricating between the shaft and the bearing;

a thrust bearing plate pressed into and fixed to the housing; and a stopper pressed into the shaft to prevent the shaft from slipping out of the bearing, the stopper sliding on the thrust bearing plate, wherein a cylindrical side wall is located at an end side of the housing that is closer to the thrust bearing plate thereby to surround an outer periphery of the stopper, said side wall having an end surface set to be higher than a top surface of an outermost periphery of the stopper.

* * * * *